Figure 1:
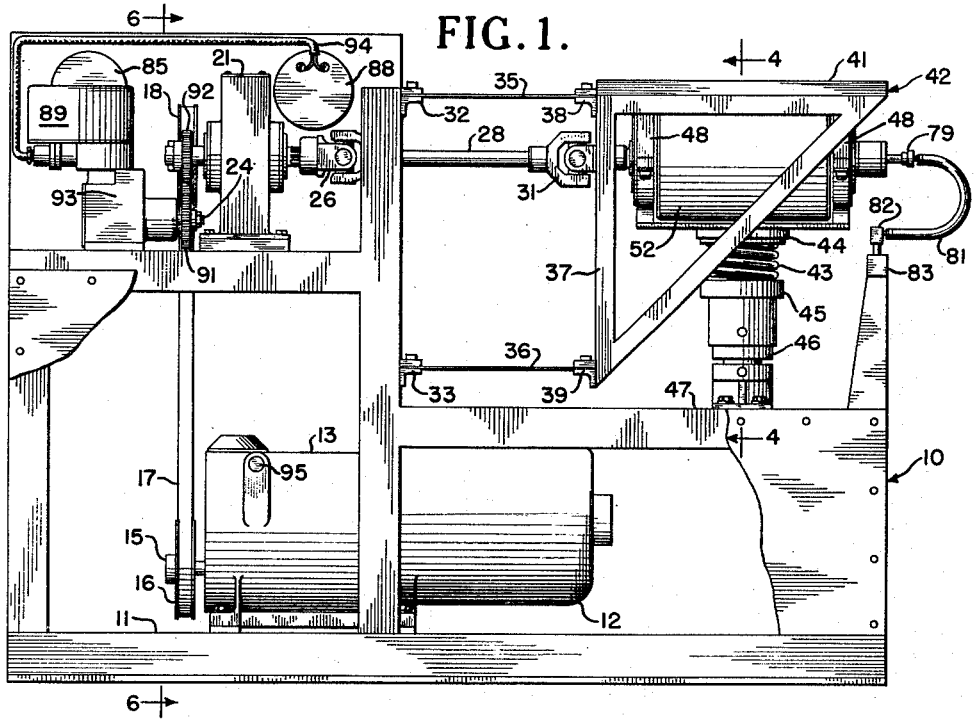

March 8, 1955   W. C. BRUEGGEMAN ET AL   2,703,490
PRESSURE CONTROLLED VIBRATION PRODUCING MACHINE Filed Jan. 22, 1952   4 Sheets-Sheet 1

INVENTOR
W. C. BRUEGGEMAN
J. T. HART, JR.

BY
ATTORNEYS

March 8, 1955 W. C. BRUEGGEMAN ET AL 2,703,490
PRESSURE CONTROLLED VIBRATION PRODUCING MACHINE
Filed Jan. 22, 1952 4 Sheets-Sheet 2

INVENTOR
W. C. BRUEGGEMAN
J. T. HART, JR.

BY
*G. D. O'Brien*
*R. M. Hicks* ATTORNEYS

March 8, 1955 W. C. BRUEGGEMAN ET AL 2,703,490
PRESSURE CONTROLLED VIBRATION PRODUCING MACHINE
Filed Jan. 22, 1952 4 Sheets-Sheet 3
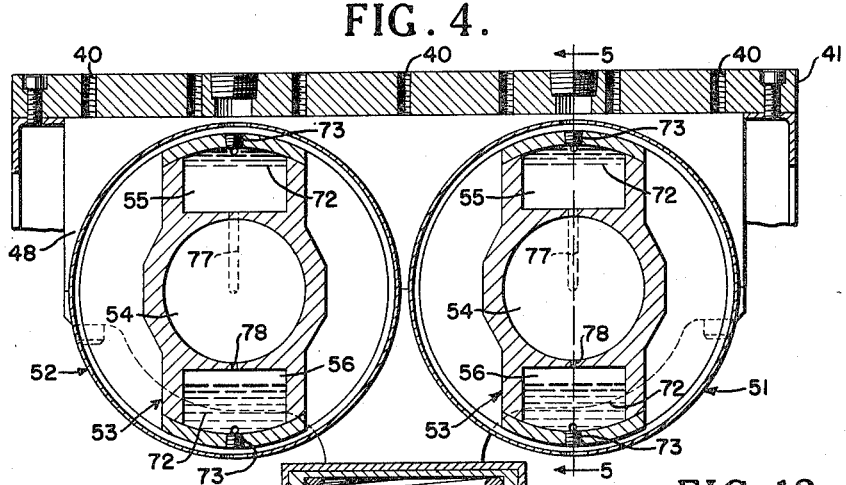
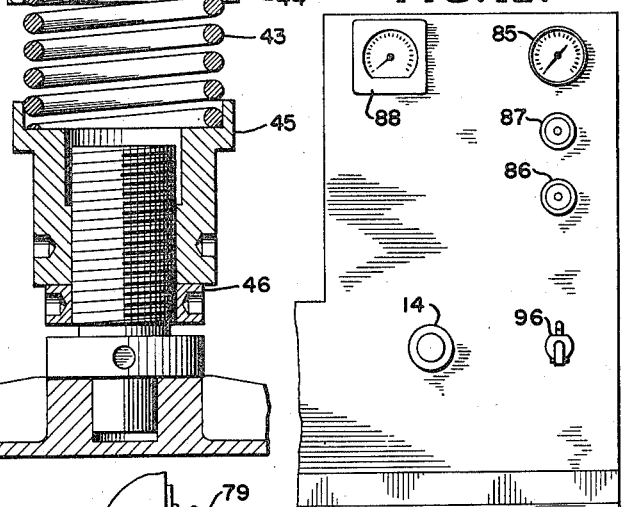
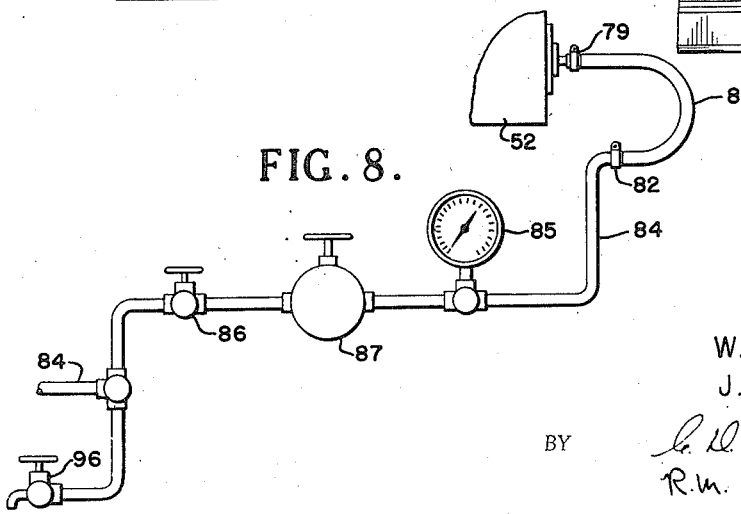
INVENTOR
W. C. BRUEGGEMAN
J. T. HART, JR.
BY
ATTORNEYS March 8, 1955  W. C. BRUEGGEMAN ET AL  2,703,490
PRESSURE CONTROLLED VIBRATION PRODUCING MACHINE
Filed Jan. 22, 1952  4 Sheets-Sheet 4

INVENTOR
W. C. BRUEGGEMAN
J. T. HART, JR.
BY
ATTORNEYS

United States Patent Office 2,703,490
Patented Mar. 8, 1955

2,703,490

PRESSURE CONTROLLED VIBRATION PRODUCING MACHINE

William C. Brueggeman, Silver Spring, Md., and John T. Hart, Jr., Washington, D. C.

Application January 22, 1952, Serial No. 267,682

6 Claims. (Cl. 73—67)

(Granted under Title 35, U. S. Code (1952), sec. 266)

The present invention relates to vibration producing machines for testing the life of devices under various conditions of vibration and more particularly to apparatus for producing vibration by incorporating therein a pair of contra-rotating units mounted for rotation on a table supported by a single spring and a plurality of flexure plates, the units containing a heavy liquid, such as mercury, as the unbalancing element. Each of the units is provided with a pair of diametrically opposed chambers, the amount of mercury being initially balanced in the chambers. The mercury is forced from one chamber to the other chamber by air under pressure to cause an unbalance in the chambers proportional to the pounds per square inch of pressure. Thus when the units are rotated vibration is produced by reason of such unbalance of the mercury. In providing contra-rotating units the effects of unbalance are neutralized laterally and are effective in vertical directions as in the present arrangement. It is, of course, to be understood that, with slight modification, the effective unbalance can be arranged to cause vibration in any specific direction.

It is also a feature of the present invention to change the amount of unbalance of the units during rotation thereof by varying the air pressure in a manner to secure a desired amplitude of vibration and when the rotative speed of the units is changed, the control pressure being held constant, to provide a substantially constant acceleration.

An object of the present invention is to provide an improved pressure-controlled apparatus for producing high acceleration vibration.

Another object is to provide an improved apparatus in which liquid is employed as the unbalancing medium for producing vibration which is susceptible to easy and simple remote control. Still another object is to provide an improved vibration producing apparatus in which transverse motion is substantially eliminated.

A further object is to provide a pressure-controlled apparatus for vibrating a test table in which the acceleration of the table remains substantially constant for a given pressure and load regardless of speed.

A still further object is to provide an improved air pressure-controlled vibration producing apparatus employing liquid as an unbalance producing medium in which the amplitude and frequency of vibration may be conveniently and simply varied during operation of the device.

Figure 2:
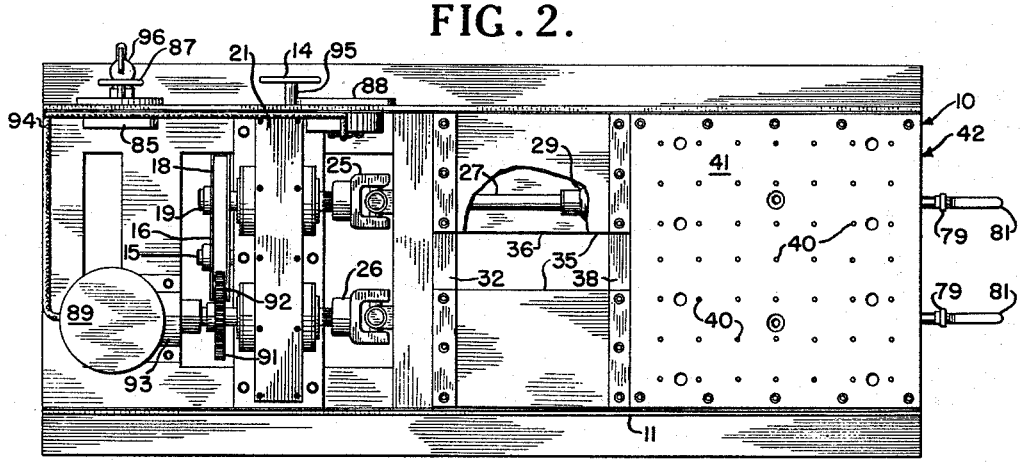
Figure 9:
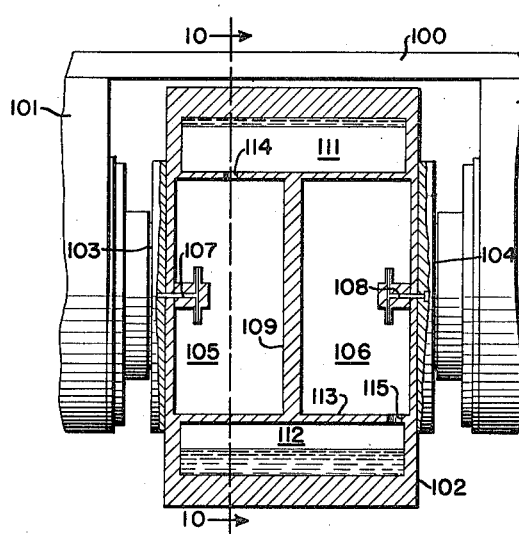
Figure 3:
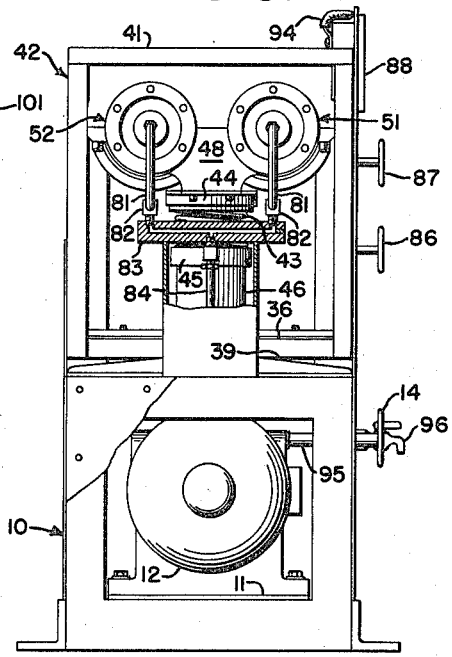
Figure 10:
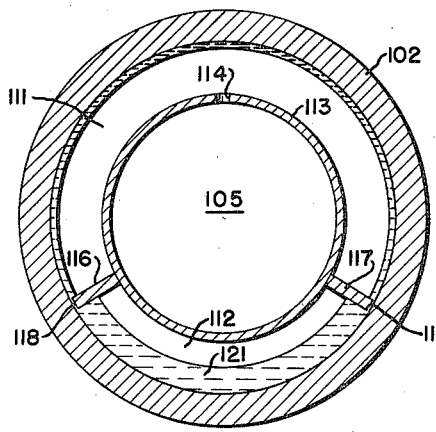
Figure 11:
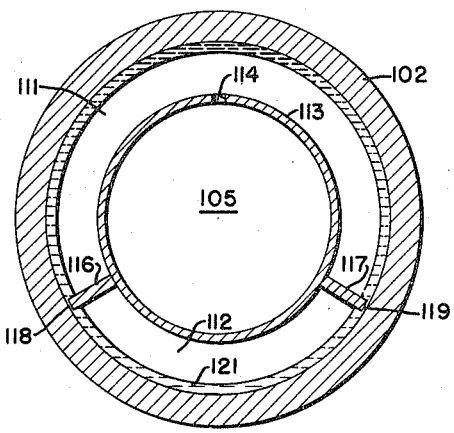
Figure 5:
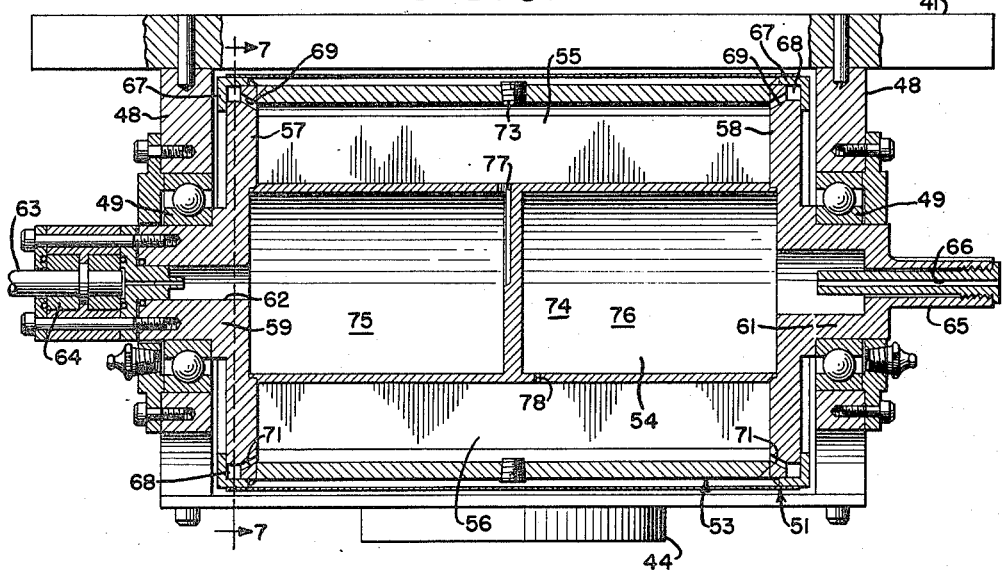
Figure 6:
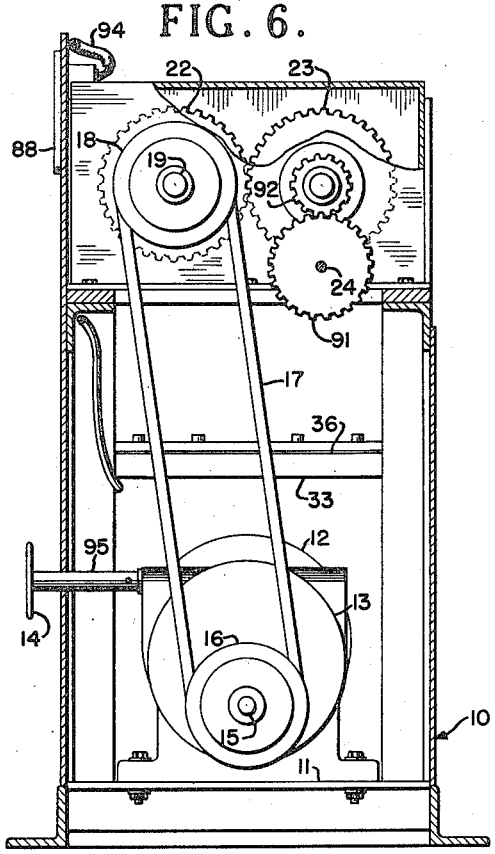
Figure 7:
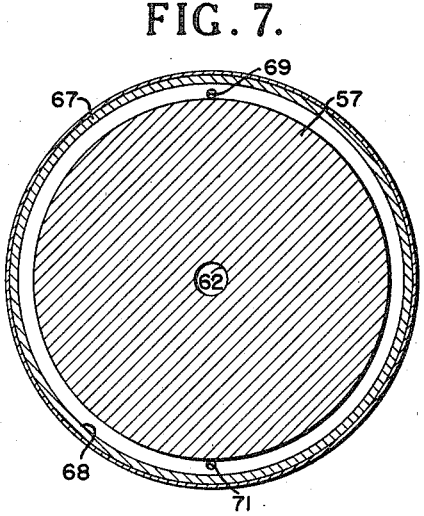

Other objects and many of the attendant advantages of this invention will be readily appreciated as the same becomes better understood by reference to the following detailed description when considered in connection with the accompanying drawings wherein:

Fig. 1 is a side elevation of the device of the present invention, parts being broken away;
Fig. 2 is a top plan view of the device of Fig. 1;
Fig. 3 is an end elevation thereof;
Fig. 4 is a sectional view taken along line 4—4 of Fig. 1;
Fig. 5 is a sectional view taken along line 5—5 of Fig. 4;
Fig. 6 is a sectional view taken along line 6—6 of Fig. 1;
Fig. 7 is a sectional view taken along line 7—7 of Fig. 5;
Fig. 8 is a diagram of the tubing arrangement employed in the present invention;
Fig. 9 is a sectional view of a slight modification of the device;
Fig. 10 is a sectional view along line 10—10 of Fig. 9;
Fig. 11 is a sectional view similar to Fig. 10 and showing the position of the mercury at equal pressure in both chambers; and
Fig. 12 is an elevation of the control panel of the present invention.

Referring more particularly to the drawings wherein like numerals of reference indicate like parts throughout the several views, 10 indicates generally a frame or stand for supporting the apparatus of the present invention. Frame 10 is provided with a base plate 11 having an electric motor or other prime-mover 12 mounted thereon. Motor 12 is fitted with a drive ratio changing box 13 of any well-known variety which provides a wide range of ratio change, such changes being effected by rotation of a knob 14 of box 13 in a manner to be hereinafter more fully described. Gear box 13 has an output shaft 15 projecting therefrom.

Pulley 16 is mounted on shaft 15 and drives V-belt 17 which, in turn, drives pulley 18 mounted on shaft 19 of gear box 21 which is mounted on frame 10 and contains a pair of meshed contra-rotating gears 22 and 23, gear 22 being fixed on shaft 19 while gear 23 is fixedly mounted on a shaft 24. Shafts 19 and 24 each have mounted on one of the ends thereof universal joints 25 and 26, respectively which, in turn, have attached thereto shafts 27 and 28. Shafts 27 and 28 have attached at the other ends thereof universal joints 29 and 31, the purpose of which will be hereinafter more fully described.

A pair of vertically spaced horizontal frame members 32 and 33 are mounted on the side of extension 34 of frame 10. Upper flexure plates 35 are secured at one end thereof to member 32, while lower flexure plates 36 are secured at one end thereof to member 34. Triangular frame members 37 are joined together by upper and lower horizontal frame members 38 and 39 which are secured to the other ends of flexure plates 35 and 36, respectively. A mounting plate 41 is secured to frame members 37 to form a vibrating table indicated generally at 42 and is provided with a plurality of threaded bores 40 in order that a variety of sizes and shapes of devices to be tested under various conditions of vibration may be bolted thereto.

Flexure plates 35 and 36 provide for vertical motion of the table 42 and resist lateral motion thereof.

Table 42 is also supported by a spring 43 mounted in cups 44 and 45, cup 45 forming a part of screw jack 46 which is for adjusting the height of table 42. Jack 46 is secured to cross member 47 of frame 10. Cup 44 is fixed to the structure of table 42.

Secured to the underside of plate 41 at opposite ends thereof are bearing supports 48 each of which receives a pair of spaced ball bearing assemblies 49. A pair of contra-rotating vibration producing units 51 and 52 are mounted for rotation in bearings 49. Each of the units 51 and 52 comprises a body portion 53 divided into a central cavity 54 and a pair of outer diametrically opposed chambers 55 and 56, chamber 55 being the pressure chamber and 56 being the unbalance chamber. Cavity 54 and chambers 55 and 56 are closed at the ends thereof by circular end plates 57 and 58 which are secured thereto by welding or the like in a manner to be leakproof. End plates 57 and 58 are provided with trunnions 59 and 61, respectively, the trunnions being fitted in bearings 49.

Trunnion 59 is provided with a bore 62 to receive a non-rotating air inlet 63 and has a seal 64. Trunnion 61 is provided with an extended shaft 65 and a vent bore 66 therethrough for venting the air from the cavity 54. Each of the shafts 65 is secured to one of the universal joints 29, thus providing for driving the units by motor 12, through gears 22 and 23 which reverse the rotation of one unit with respect to the other.

End plates 57 and 58 are provided with circumferential L-shaped in cross-section closures 67 welded in leakproof engagement therewith, the periphery of each of the end plates being cut away to form a channel 68 between the closure and the end plate. The channels 68 have bores 69 communicating with pressure chamber 55 and bores 71 communicating with unbalance chamber 56.

It will thus be seen that at atmospheric pressure quantities of mercury 72 placed within the chambers 55 and 56 through filler plugs 73 will upon rotation of the unit pass through channels 68 from the chambers until the quantity is equally divided or balanced in the two chambers. The units 51 and 52 will under such conditions rotate without vibration.

Central cavity 54 is provided intermediate the ends thereof with a partition or bulkhead 74 which divides the cavity into an inlet chamber 75 and an outlet chamber 76, the inlet chamber 75 communicating with air inlet 63 and having a bore 77 communicating with pressure chamber 55 and the outlet chamber 76 communicating with air vent bore 66 and having a bore 78 communicating with chamber 56. It will thus be seen that when air or other suitable gas is forced under a predetermined pressure into chamber 75 during rotation of the units, the mercury being of equal quantities in chambers 55 and 56 and being thrown by centrifugal force against the outer walls of the chambers, the air under pressure passes through bore 77, into chamber 55, forcing a quantity of mercury through bores 69, through channels 68, bores 71, and into chamber 56. The amount of mercury displaced from chamber 55 is proportional to the pounds per square inch of pressure exerted against the mercury in chamber 55.

Connected to the air inlets 63 by fittings 79 are flexible rubber hose connections 81 which are connected by fittings 82 at the other ends thereof to a divider fitting 83 which is mounted on frame 10. A metal tubing 84 leads from the fitting 83 to a source of air or gas under pressure. Interposed between the source and the fitting 83 are a pressure gauge 85, a shut-off valve 86, and a pressure control valve 87.

In order to provide a reading of the revolutions per minute of the units 51 a tachometer 88 is operated by a tachometer generator 89 which is driven from shaft 24 by exposed gears 91 and 92 and gear box 93. An electrical cable 94 is provided to connect generator 89 with tachometer 88.

In order to change the speed of rotation of units 51 and 52 the driving ratio between motor 12 and pulley 16 is changed by rotating knob 14, a shaft 95 connecting knob 14 with ratio changing box 13.

A bleed valve 96 is also connected in line 84 to bleed the line of pressure after valve 86 is closed and to equalize the pressure on both sides of the mercury in units 51 and 52.

A slight modification of the vibration producing apparatus of the present invention is illustrated in Figs. 9, 10 and 11, the contra-rotating principle being employed herein as in the preferred form. The vibrating table or plate 100 is mounted as in the preferred form and has thereunder bearing mounts 101, a vibrating unit 102 being supported for rotation on shafts 103 and 104 set in the bearing mounts 101. Unit 102 is cylindrical in form and is provided with a pair of axial chambers 105 and 106, the chamber 105 being provided with an air inlet 107 which is connected to a source of supply of air under pressure, chamber 106 being provided with an air outlet 108 which opens to the atmosphere. Chambers 105 and 106 are separated by a wall or bulkhead 109 and are separated from arcuate chambers 111 and 112 by a cylindrical wall 113. Chamber 105 communicates with chamber 111 through orifice 114, while chamber 106 communicates with chamber 112 through orifice 115. Pressure chamber 111 and unbalance chamber 112 are separated by bulkheads 116 and 117, small clearances 118 and 119 being provided at the outer ends of 116 and 117 to form passages for mercury 121 contained in chambers 111 and 112.

It is apparent that when air under pressure is admitted to chamber 111, the unit 102 being rotated and the mercury 121 being held at the outer walls of chambers 111 and 112 by centrifugal force, a portion of the mercury in chamber 111 will be forced through clearances 118 and 119 into chamber 112, the air in chamber 112 displaced by the mercury passing through orifice 115, into chamber 106, through outlet 108 to atmosphere. The operation thereof is substantially the same as in the preferred form of the invention.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed as new and desired to be secured by Letters Patent of the United States is:

1. In a vibration producing apparatus comprising, in combination, a rotor member having a pair of diametrically opposed chambers, means for rotating said rotor member, means interposed between said rotating means and said rotor member for varying the rotative speed of said rotor member, said chambers being partly filled with a heavy fluid, channels for establishing fluid communication between said chambers, the amount of fluid in said chambers normally being balanced by centrifugal force when said rotor member is rotated, and pressure means connected to one of said chambers for forcing a quantity of said fluid therefrom and into the other of said chambers to produce an unbalance in said rotor member.

2. In a vibration producing apparatus comprising, in combination, a pair of rotating members, each of said members having a pair of diametrically opposed chambers, means for rotating said members, gear means interposed between said rotating means and said members for rotating one of said members in an opposite direction with respect to the other member, said chambers being partly filled with a metallic fluid, fluid channels interconnecting the chambers of each of said members for providing communication therebetween, the quantity of fluid in each of said chambers being normally equalized by centrifugal force as the members rotate, and means for controlling the entrance of a gas under pressure into one of said chambers in each of said members whereby the metallic fluid is forced from said one of said chambers and into the other of said chambers to cause an unbalance in each of said members.

3. A vibration producing apparatus comprising, in combination, a mounting plate, a pair of contra-rotating members mounted for rotation on said plate, each of said contra-rotating members having a pair of diametrically opposed chambers, channel passages interconnecting each pair of chambers adjacent the outer walls thereof, said chambers being partly filled with a metallic liquid, the amount of liquid normally equalizing in the the chambers of each pair of chambers as the members rotate by passage of the liquid through said channel passages, pressure means connected to one of each pair of chambers for forcing a quantity of the liquid from said one of said chambers to the other of said chambers whereby the chambers become unbalanced, and means for regulating the amount of pressure admitted to the chambers to control the amount of unbalance of said chambers.

4. Apparatus for vibrating a device to be tested comprising, in combination, a fixed frame structure, a movable mounting plate adapted to receive said device, a plurality of flexure plates suspending said mounting plate from said frame structure for substantially straight-line movement perpendicular to the face of said plate, a spring mounted on said frame and supporting said mounting plate, a screw jack interposed between said frame and said spring for adjusting the height of the mounting plate with respect to said frame to compensate for a variety of loads placed on said plate, a pair of rotary vibrator units mounted for rotation on said plate, variable ratio driving means for said vibrator units mounted in said frame, gear means interposed between the driving means and said units for rotating the units in opposite directions respectively, flexible driving means between said gear means and the units, means including a pair of chambers in each of said units said chambers being initially balanced with equal amounts of mercury in each of said chambers, and pressure means for forcing a measured amount of said mercury from one of said chambers to the other of said chambers to produce an unbalance therein thereby to cause vibration of said units as the units are rotated, the amount of unbalance being proportional to the amount of pressure admitted to said one of said chambers.

5. Apparatus for producing vibration comprising, in combination, a fixed frame structure, a movable mounting plate, a plurality of flexure plates suspending said mounting plate from said frame structure for substantially straight-line movement perpendicular to the face of said plate, a spring mounted on said frame and yieldably supporting said mounting plate, a pair of rotary vibrator units mounted for rotation on said plate, variable ratio means mounted in said frame for driving said vibrator units, gear means interposed between said driving means and said units for rotating the units in opposite directions respectively, flexible driving means individual to each of said units and connecting said units with said gear means, a pair of intercommunicating chambers in each of said units and initially partly filled with equal parts of mercury respectively, a source of gas under pressure, and pressure regulating means for admitting a predetermined quantity of said gas under pressure into one of each of said pairs of chambers to force a quantity of mercury from said chamber to the other chamber of each pair to cause an unbalance of the amount of mercury in the chambers of each of said units.

6. Apparatus for producing vibration comprising, in combination, a frame, a table yieldably mounted on said frame for vertical movement with respect thereto, a variable ratio driving device mounted in said frame, a plurality of initially balanced rotating units mounted on said table, flexible means for transmitting rotative motion from said driving device to said plurality of rotating units, each of said units having a pair of axially opposed interconnected chambers, each pair of chambers having initially an equal portion of mercury contained therein, a source of air under pressure, a conduit connecting one of the chambers of each of said pair of chambers with said source, a valve interposed in said conduit for regulating the amount of air under pressure entering said chambers whereby the mercury is displaced from one of each pair of chambers into the other of said pair, a gauge connected to said conduit between said valve and said chambers for indicating the pressure of said air, and a bleed valve connected to said conduit for relieving the pressure in said chambers.

References Cited in the file of this patent
UNITED STATES PATENTS

| | | |
|---|---|---|
| Re. 22,416 | Eksergian | Jan. 11, 1944 |
| 1,243,345 | Rodgers | Oct. 16, 1917 |
| 1,554,014 | MacFarland | Sept. 15, 1925 |
| 1,881,332 | Sonntag | Oct. 4, 1932 |
| 2,634,617 | Dryg | Apr. 14, 1953 |